W. N. SELIG.
CUTTING TOOL.
APPLICATION FILED SEPT. 6, 1910.
990,787.
Patented Apr. 25, 1911.
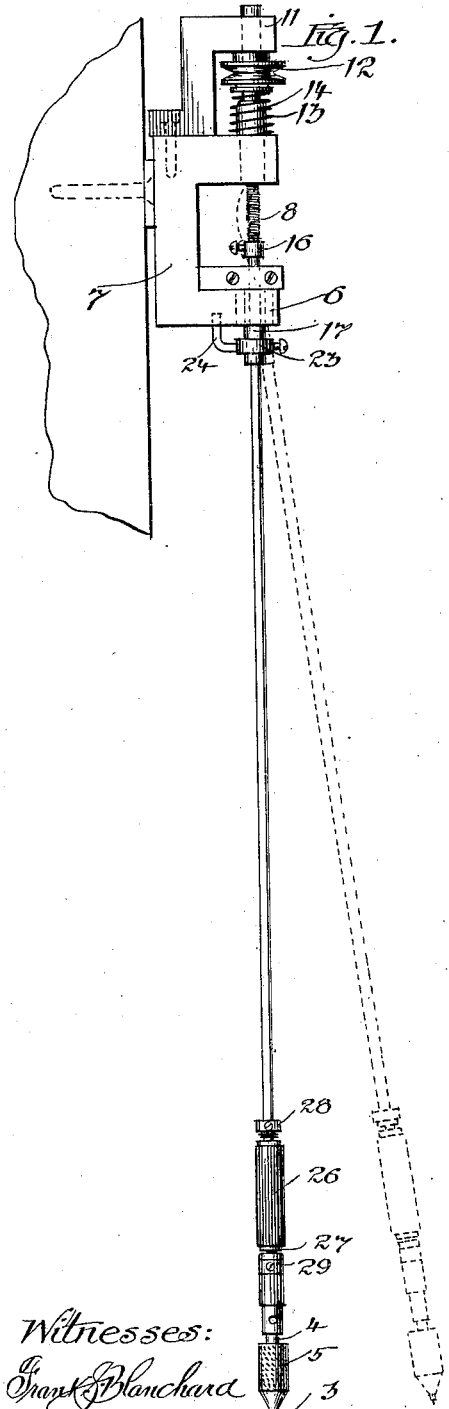
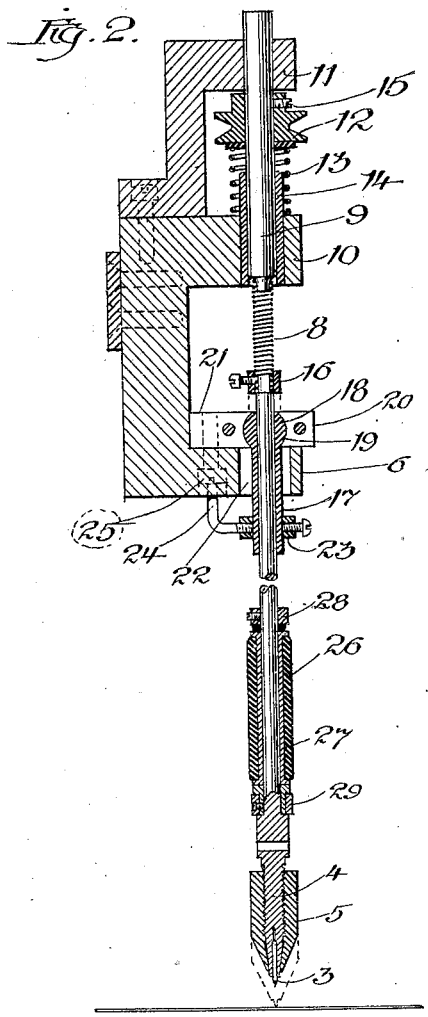
Witnesses:
Frank Blanchard
Inventor:
William N. Selig.
By Banning & Banning
Attorneys.

UNITED STATES PATENT OFFICE.

WILLIAM N. SELIG, OF CHICAGO, ILLINOIS, ASSIGNOR TO SELIG POLYSCOPE COMPANY, OF CHICAGO, ILLINOIS, A CORPORATION OF ILLINOIS.

CUTTING-TOOL.

990,787.  Specification of Letters Patent.  Patented Apr. 25, 1911.

Application filed September 6, 1910. Serial No. 580,689.

*To all whom it may concern:*

Be it known that I, WILLIAM N. SELIG, a citizen of the United States, residing at Chicago, in the county of Cook and State of Illinois, have invented certain new and useful Improvements in Cutting-Tools, of which the following is a specification.

The present invention relates to a cutting tool designed and adapted more especially for cutting patterns from flexible substances, as, for instance, paper, thin celluloid, photographic films, etc.

The objects of the present invention are, to construct a tool which is cheap and simple, which is accurate in operation, and in which no fine adjustment of the parts is necessary in order to maintain the tool in condition for efficient operation.

Further objects of the invention are, to provide means for mounting the tool so that it may be moved in any direction desired with respect to the work, whereby the tool may be manipulated so as to follow the most irregular of patterns; to provide a suitable finger piece or handle for actuating the tool, which will remain in fixed position with respect to the rotating of the tool; to provide high speed mechanism for rotating the tool, whereby the high speed of rotation will cause the tool to exert a cutting action upon the work when brought into engagement therewith; and to provide means for limiting the movement of the tool.

Further objects will appear from a detailed description of the invention and the combination of parts hereinafter described and claimed.

In the drawings, Figure 1 is a side elevation showing the tool in full lines in vertical position, and showing in dotted lines the position assumed when swung to one side; and Fig. 2, an enlarged sectional elevation of the parts shown in Fig. 1, with the rod partially broken away.

It has been found impractical in cutting patterns of forming stencils from flexible material, as, for instance, paper or photographic films, to move the cutting tool over the surface with a rotary action; that is to say, it has been found impractical to use the ordinary circular cutting tool and revolve it around its pivotal center. This is because of the fact that the tool when actuated in this manner crowds the work ahead of its cutting edge, which crowding produces a bulging, and which causes a tearing of the material when the tool passes therethrough.

In the present invention, it is the intention to revolve a sharp pointed tool rapidly and longitudinally of itself, it being a well known fact that a sharp pointed tool revolving rapidly will produce the same cutting effect when brought in contact with the surface of the work, as a blade or cutting wheel passed over the surface of the work, the only difference being that in the case of the sharp pointed tool a very small acting surface is brought into engagement with the work. Hence, the crowding of the work ahead of the tool is eliminated where a finely pointed tool is utilized. It is, of course, essential, in order to carry out this principle of operation, that the tool be rotated at high speed; otherwise, it would pass through the work in a manner to tear the same and would, obviously, not be practical for the objects and purposes of the present invention.

The device of the present invention comprises a tool 3 of any suitable style and size, provided that it contains the feature of a fine sharp point. The tool is mounted in the end of a rod 4 and is held in place thereon by means of a suitable chuck 5. The rod, as shown in Fig. 1, extends upwardly and passes through an arm 6 of a fixed bracket 7; and said rod 4 is connected at its upper end to a flexible member 8, which, as shown, is in the form of a coil spring; and said spring has its other end connected to the lower end of a stub shaft 9, which is mounted in arms 10 and 11 of the bracket 7, and the stub shaft having secured thereto a pulley 12. Said pulley is connected by means, not shown, of any suitable character and description well known to any skilled mechanic, for rotating the same at high speed.

The stub shaft 9 is slidably mounted within the arms 10 and 11 to permit of up and down movement therein, and said shaft is held normally upward in the position shown in Fig. 2 through the medium of a coil spring 13, which is interposed between the lower face of the pulley 12 and the upper face of the arm 10, and, as shown, a bushing 14 is secured within the arm 10 to provide a smooth bearing for the shaft 9. The pulley 12 is secured to the shaft 9 through the medium of a set-screw 13, or in any other suitable and well known manner.

Secured to the upper end of the rod 4 is a collar 16, which serves to secure the spring 8 in place and also serves as a stop member to limit the downward movement of the rod 4, the upward movement of the rod being limited by contact of the upper face of the pulley 12 with the lower face of the arm 11. Secured to the rod 4, as shown more clearly in Fig. 2, is a sleeve 17 which terminates in a ball 18 setting within a socket 19 in a plate 20, which is formed in two sections to permit of the assembling of the ball within the recess; and the plate is secured to the arm 6 through the medium of a screw 21. As shown in Fig. 2, a clearance 22 is provided in the arm 6, so that considerable lateral play of the sleeve 17 within the arm 6 is permitted. Attached to the sleeve 17 is a collar 23, to which is connected a stem 24 which enters a recess 25 formed in the lower face of the arm 6. The stem, however, has not a close fit within the recess, but is allowed a certain movement or play therein. This stem 24 serves as a stop member to limit the lateral movement of the rod 4 beyond the bounds necessary in usage It will thus be seen that through the medium of this ball and socket joint, and through the medium of the slidable mounting of the rod within the arms, and through the medium of the flexible connection between the stub shaft 9 and the rod 4, and through the medium of the slidable manner of mounting the shaft 9, movement in any direction up and down or sidewise is permitted the rod 4. Hence, the tool 3 can be moved in a manner to follow the most intricate patterns, and by the up and down movement the tool can be readily, quickly and accurately brought into and out of engagement with the work, whereby the starting and stopping of the cutting operation is accurately under control of the operator.

A handle is provided for the tool, which, in the form shown, comprises an elongated sleeve 26, preferably provided with a knurled face. The sleeve 26 is attached to an interior sleeve 27, which is loosely mounted upon the shaft 4; and the sleeve 27 is held in fixed position through the medium of collars 28 and 29. Consequently, a handle is provided for the operator, which he may grasp and guide the tool, and at the same time the handle remains stationary with respect to the turning of the tool, which, of course, would be necessary in order to provide a practical grip for the operator.

I claim:

1. In a cutting tool, the combination with a rotatable pointed tool and high-speed mechanism operatively connected for rotating said tool, whereby a cutting action is provided, of a mounting for the tool, consisting of a rod, in the end of which the tool is mounted, a sleeve in which the rod is slidably mounted, a fixed bracket, a ball and socket connection between the bracket and sleeve, a stub shaft slidably mounted in the bracket, a flexible connection between the rod and stub shaft, a driven member connected to the stub shaft, tension mechanism for normally maintaining the stub shaft and driven member in raised position, and means for limiting the movement of said stub shaft and driven member, substantially as described.

2. In a cutting tool, the combination with a rotatable pointed tool and high-speed mechanism operatively connected for rotating said tool, whereby a cutting action is provided, of a mounting for the tool, consisting of a rod, in the end of which the tool is mounted, a sleeve in which the rod is slidably mounted, a fixed bracket, a ball and socket connection between the bracket and sleeve, a stub shaft slidably mounted in the bracket, a flexible connection between the rod and stub shaft, a driven member connected to the stub shaft, tension mechanism for normally maintaining the stub shaft and driven member in raised position, means for limiting the movement of said stub shaft and driven member, said bracket having a recess therein, and a finger carried by said sleeve, adapted to enter said recess, and serving as a stop member to limit the movement of said sleeve, substantially as described.

WILLIAM N. SELIG.

Witnesses:
A. A. DAVISON,
HARRY GORDON.

---

Copies of this patent may be obtained for five cents each, by addressing the "Commissioner of Patents, Washington, D. C."